US012681591B2

(12) United States Patent
Maeyama

(10) Patent No.: US 12,681,591 B2
(45) Date of Patent: *Jul. 14, 2026**

(54) PEN STATE DETECTION CIRCUIT AND METHOD, AND INPUT SYSTEM

(71) Applicant: Wacom Co., Ltd., Saitama (JP)

(72) Inventor: Koichi Maeyama, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/067,631

(22) Filed: Feb. 28, 2025

(65) Prior Publication Data

US 2025/0199628 A1    Jun. 19, 2025

Related U.S. Application Data

(63) Continuation of application No. 18/670,498, filed on May 21, 2024, now Pat. No. 12,265,668, which is a continuation of application No. 18/365,914, filed on Aug. 4, 2023, now Pat. No. 12,026,326.

(30) Foreign Application Priority Data

Aug. 9, 2022    (JP) ................................. 2022-127263

(51) Int. Cl.
*G06F 3/0354*        (2013.01)

(52) U.S. Cl.
CPC ................................. *G06F 3/03545* (2013.01)

(58) Field of Classification Search
CPC .. G06F 3/03545; G06F 3/0321; G06F 3/0488; H04N 1/00244
See application file for complete search history.

(56) References Cited

U.S. PATENT DOCUMENTS

| | | |
|---|---|---|
| 2015/0116279 A1 | 4/2015 | Ohba et al. |
| 2021/0286453 A1 | 9/2021 | Nomura et al. |
| 2021/0389833 A1 | 12/2021 | Maeyama et al. |

FOREIGN PATENT DOCUMENTS

JP        2015087785 A     5/2015

*Primary Examiner* — Michael Pervan
(74) *Attorney, Agent, or Firm* — Seed Intellectual Property Law Group LLP

(57) ABSTRACT

Provided is a pen state detection circuit for detecting a state of an electronic pen based on a signal distribution detected by a touch sensor including a plurality of sensor electrodes arranged in a plane shape, the electronic pen including at least one electrode, the pen state detection circuit, in operation, acquires, from the touch sensor, a first signal distribution and a second signal distribution, generates a two-dimensional signal distribution by synthesizing the first signal distribution and second signal distribution, or generates a two-dimensional feature distribution by synthesizing a first feature distribution relating to a shape of the first signal distribution and a second feature distribution relating to a shape of the second signal distribution, and estimate a position indicated by the electronic pen or a posture of the electronic pen from the two-dimensional signal distribution or two-dimensional feature distribution.

12 Claims, 14 Drawing Sheets

Figure 4:
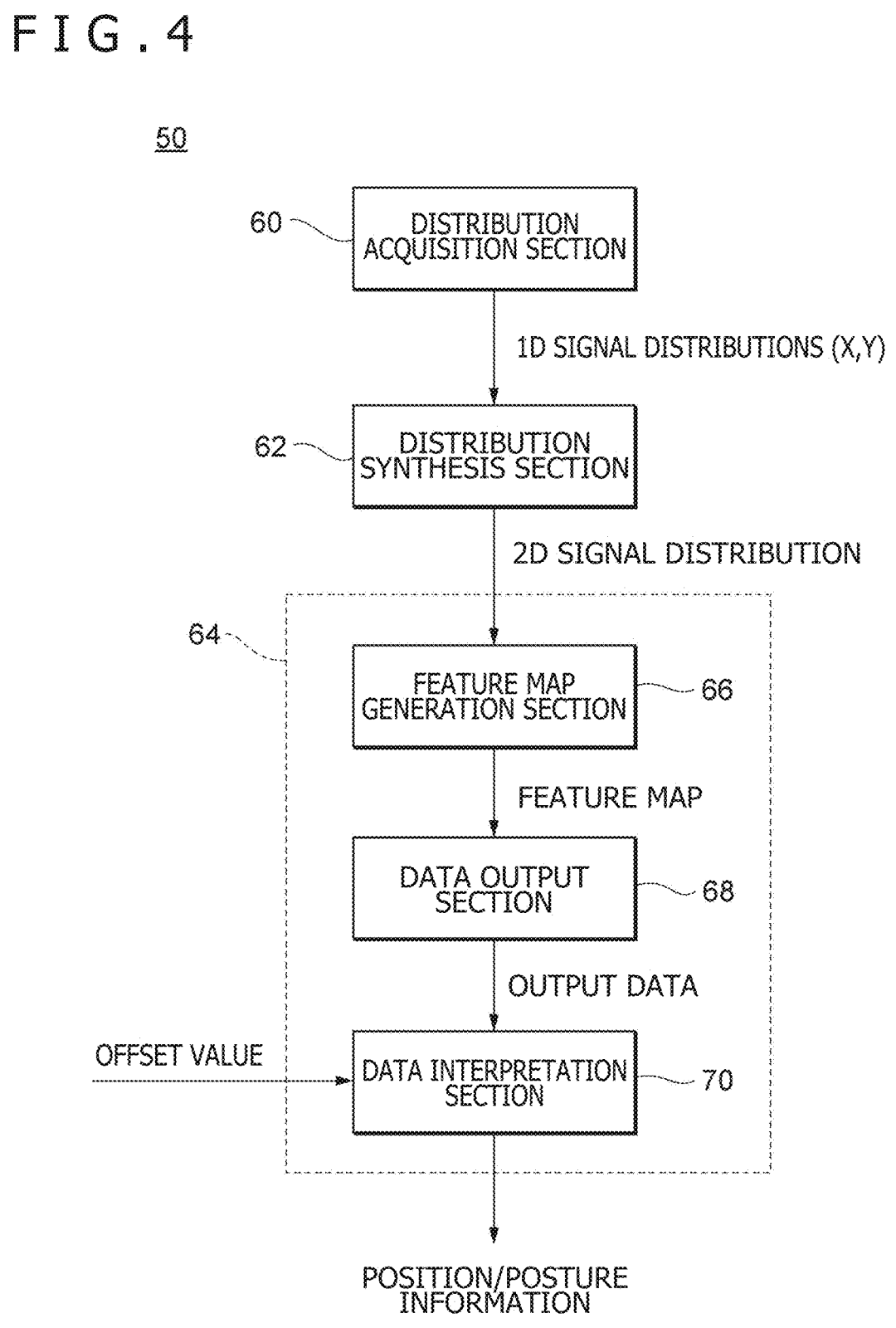

60 — DISTRIBUTION
ACQUISITION SECTION

↓ 1D SIGNAL DISTRIBUTIONS (X,Y)

62 — DISTRIBUTION
SYNTHESIS SECTION

↓ 2D SIGNAL DISTRIBUTION

64 —

FEATURE MAP
GENERATION SECTION — 66

↓ FEATURE MAP

DATA OUTPUT
SECTION — 68

↓ OUTPUT DATA

OFFSET VALUE → DATA INTERPRETATION
SECTION — 70

↓

POSITION/POSTURE
INFORMATION

F I G . 5
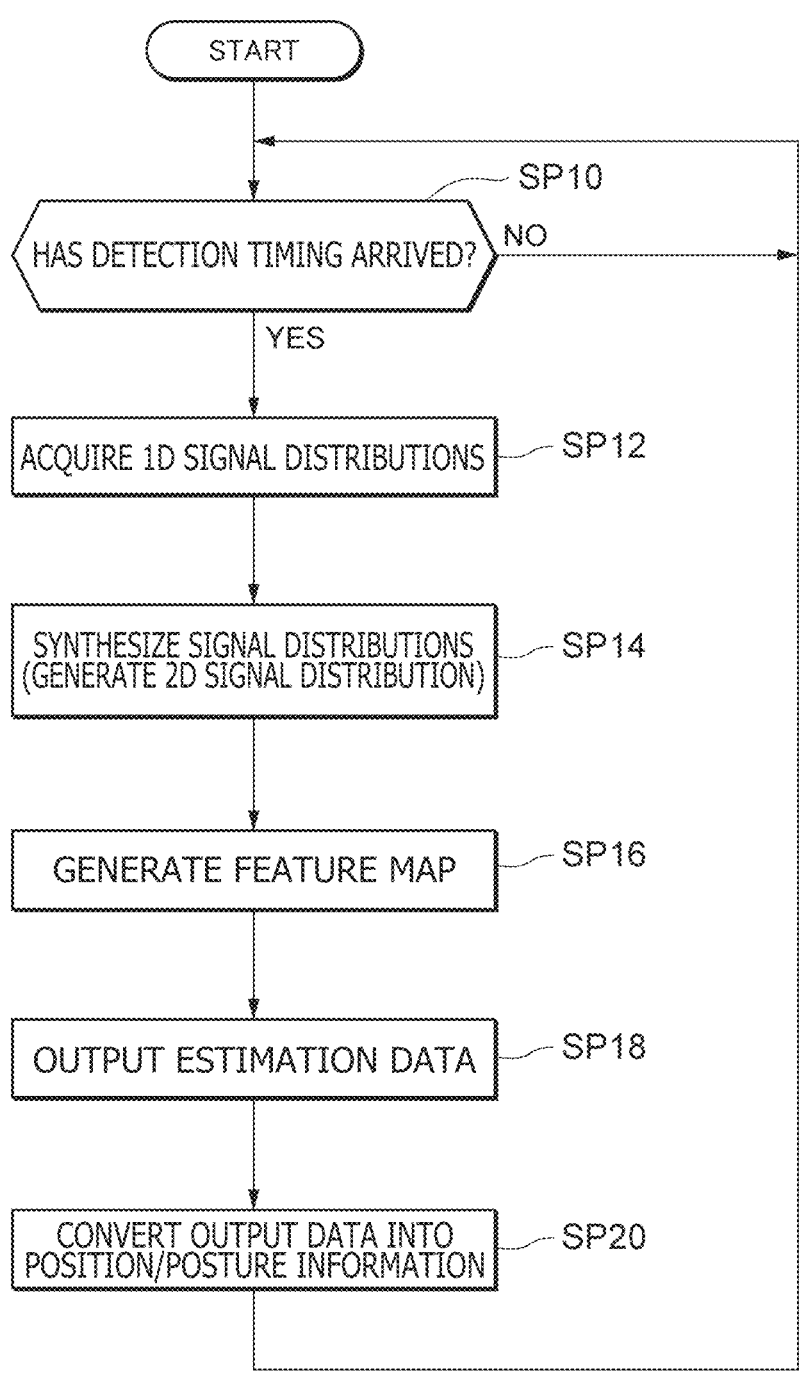

FIG.7
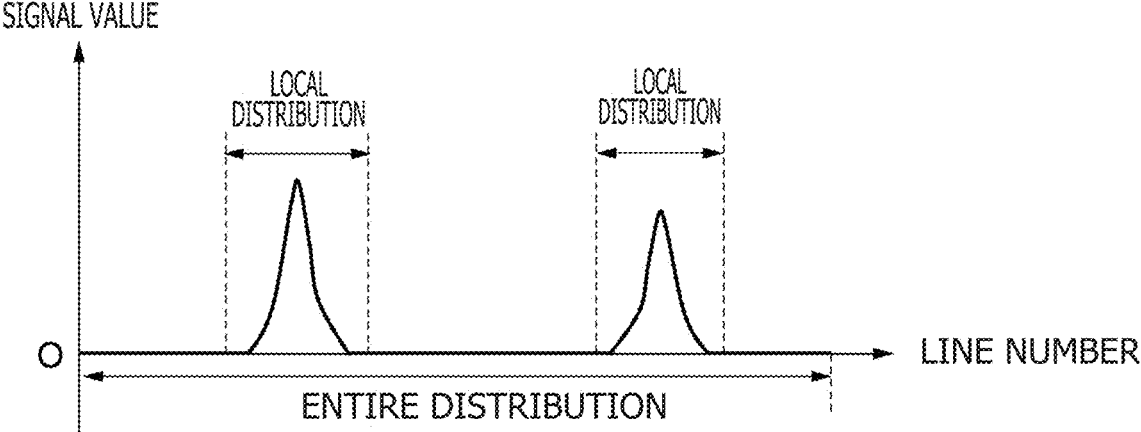
FIG.8
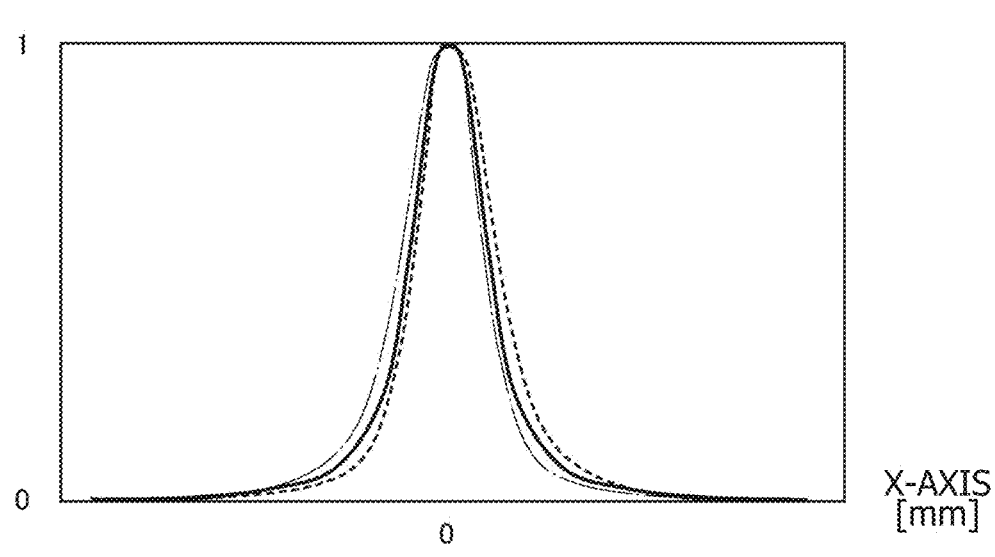

F I G . 1 2
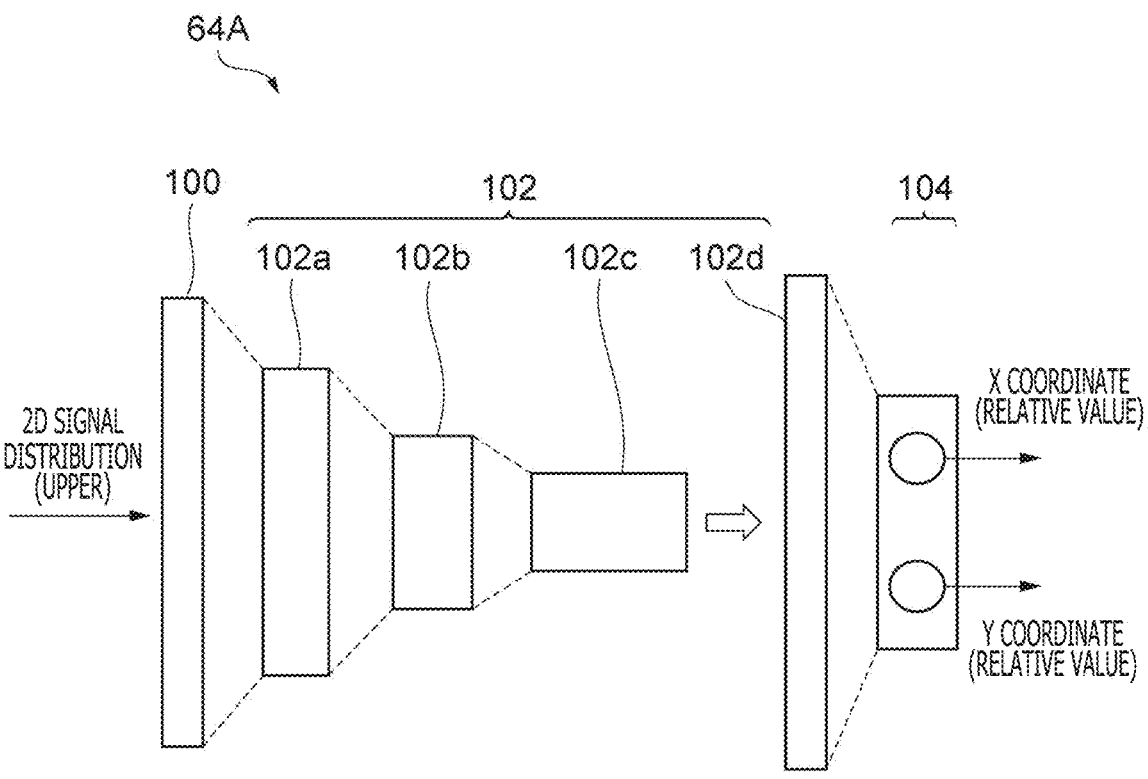

PEN STATE DETECTION CIRCUIT AND METHOD, AND INPUT SYSTEM

BACKGROUND

1. Technical Field

The present disclosure relates to a pen state detection circuit, a pen state detection method, and an input system.

2. Description of the Related Art

In the past, writing input systems including an electronic pen and an electronic device have been known. In this type of systems, it is desirable that the position indicated by the electronic pen be detected by the electronic device with high accuracy. For example, Japanese Patent Laid-open No. 2015-087785 discloses an electronic device that detects a first position touched by a user's hand on a detection surface of a touch sensor and a second position indicated by the electronic pen on the detection surface of the touch sensor, estimates the tilt orientation of the electronic pen using coordinate values of the first and second positions, and corrects the position indicated by the electronic pen on the basis of the tilt orientation.

For example, using an electronic pen with two electrodes enables estimation of the position/posture of the electronic pen even when the user's hand is not in contact with the detection surface. However, since those two electrodes are physically separated from each other, at least one of the electrodes is not typically in contact with the detection surface during the use of the electronic pen. In this case, there is a possibility that the relation between the tilt angle and the detected position of the electronic pen changes according to the three-dimensional shape of the electrodes and the estimation accuracy may vary depending on the position/posture of the electronic pen.

Therefore, it is desirable to provide a pen state detection circuit, a pen state detection method, and an input system that can improve the estimation accuracy of a pen state in an electronic pen including at least one electrode.

BRIEF SUMMARY

A pen state detection circuit according to a first aspect of the present disclosure is a circuit for detecting a state of an electronic pen based on a signal distribution detected by a touch sensor including a plurality of sensor electrodes arranged in a plane shape, the electronic pen including at least one electrode, the circuit including a processor, and a memory storing instructions which, when executed by the processor, cause the pen state detection circuit to acquire, from the touch sensor, a first signal distribution along a first direction on the touch sensor and a second signal distribution along a second direction intersecting the first direction, each of the first signal distribution and the second signal distribution being a one-dimensional signal distribution indicating a change in capacitance with approach of the electrode, generate a two-dimensional signal distribution by synthesizing the first signal distribution and second signal distribution, or generate a two-dimensional feature distribution by synthesizing a first feature distribution relating to a shape of the first signal distribution and a second feature distribution relating to a shape of the second signal distribution, and estimate, using an input and output model, a position indicated by the electronic pen or a posture of the electronic pen from the two-dimensional signal distribution or two-dimensional feature distribution.

In the synthesizing, the pen state detection circuit may generate the two-dimensional signal distribution by multiplying a first corresponding value corresponding to a position in the first direction in the first signal distribution by a second corresponding value corresponding to a position in the second direction in the second signal distribution, or generate the two-dimensional feature distribution by multiplying a first corresponding value corresponding to a position in the first direction in the first feature distribution by a second corresponding value corresponding to a position in the second direction in the second feature distribution.

The input and output model may be a machine learning model including a convolutional neural network which, in operation, receives, as an input, the two-dimensional signal distribution or the two-dimensional feature distribution and outputs coordinate values indicating the position indicated by the electronic pen.

The input and output model may be a machine learning model including a convolutional neural network which, in operation, receives, as an input, the two-dimensional signal distribution or the two-dimensional feature distribution and outputs at least one of a tilt angle or rotation angle indicating the posture of the electronic pen.

The input and output model may be a machine learning model including a convolutional neural network which, in operation, receives, as an input, the two-dimensional signal distribution or the two-dimensional feature distribution and outputs at least one of a tilt angle or rotation angle indicating the posture of the electronic pen, a first hierarchical neural network which, in operation, receives, as inputs, at least one of the tilt angle or rotation angle output from the convolutional neural network and the first signal distribution or the first feature distribution and outputs a coordinate value in the first direction indicating the position indicated by the electronic pen, and a second hierarchical neural network which, in operation, receives, as inputs, at least one of the tilt angle or rotation angle output from the convolutional neural network and the second signal distribution or the second feature distribution and outputs a coordinate value in the second direction indicating the position indicated by the electronic pen.

The electronic pen may include a plurality of the electrodes, and the two-dimensional signal distribution or the two-dimensional feature distribution may include image signals with a plurality of color channels corresponding to the electrodes.

The electronic pen may include at least a tip electrode that is symmetrical about an axis of the electronic pen and is disposed at a distal end of the electronic pen and an upper electrode that is symmetrical about the axis of the electronic pen and is disposed closer to a proximal end of the electronic pen than the tip electrode is.

A pen state detection method according to a second aspect of the present disclosure is a method for detecting a state of an electronic pen based on of a signal distribution detected by a touch sensor including a plurality of sensor electrodes arranged in a plane shape, the electronic pen including at least one electrode, the method being performed by one or more processors, the method including: acquiring, from the touch sensor, a first signal distribution along a first direction on the touch sensor and a second signal distribution along a second direction intersecting the first direction, each of the first signal distribution and the second signal distribution being a one-dimensional signal distribution indicating a change in capacitance with approach of the electrode; generating a two-dimensional signal distribution by synthesizing the first signal distribution and second signal distribution or generating a two-dimensional feature distribution by synthesizing a first feature distribution relating to a shape of the first signal distribution and a second feature distribution relating to a shape of the second signal distribution; and estimating, using an input and output model, a position indicated by the electronic pen or a posture of the electronic pen from the two-dimensional signal distribution or two-dimensional feature distribution.

An input system according to a third aspect of the present disclosure includes: an electronic device including the above-described pen state detection circuit; an electronic pen used with the electronic device; and a server device which, in operation, bi-directionally communicates with the electronic device and stores a model parameter describing an input and output model to be built in the pen state detection circuit, in which the electronic device, in operation, requests the server device to transmit the model parameter corresponding to the electronic pen when the electronic pen is detected.

According to an embodiment of the present disclosure, the estimation accuracy of the pen state of an electronic pen including at least one electrode can be improved.

BRIEF DESCRIPTION OF THE SEVERAL VIEWS OF THE DRAWINGS

FIG. 4 is a functional block diagram of a detector illustrated in FIG. 3;

FIG. 5 is a flowchart of a pen state detection operation by a touch integrated circuit (IC);

FIG. 7 is a graph illustrating an example of a 1D signal distribution acquired from a touch sensor;

FIG. 8 is a graph illustrating an example of a local distribution detected from the touch sensor when the electronic pen is in contact with the touch sensor;

FIG. 12 is a diagram illustrating a network structure constituting an input and output model according to a first example;

DETAILED DESCRIPTION OF THE PREFERRED EMBODIMENT

An embodiment of the present disclosure is described below with reference to the accompanying drawings. The same constituent components are denoted with the same signs in each drawing as much as possible to facilitate understanding of the description, and redundant description is omitted.

Description of Input System 10

Overall Configuration

Figure 1:
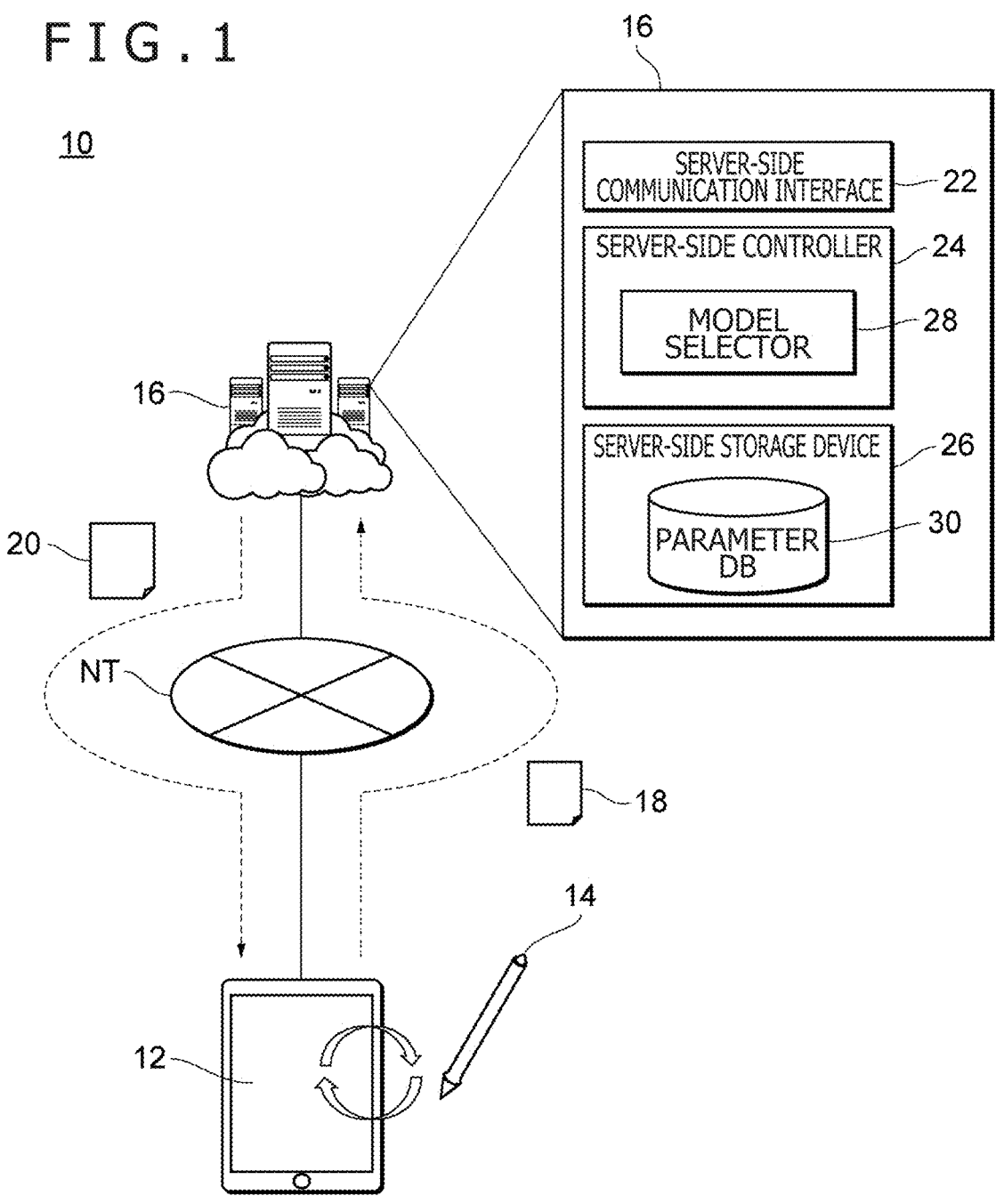
FIG. 1 is a diagram of an overall configuration of an input system according to an embodiment of the present disclosure.

FIG. 1 is a diagram of an overall configuration of an input system 10 according to an embodiment of the present disclosure. The input system 10 can accept a writing input using an electronic device 12 and an electronic pen 14 and generate digital ink (or ink data) with high reproducibility of the writing input. The input system 10 specifically includes at least one electronic device 12, at least one electronic pen 14, and a server device 16. Each electronic device 12 can communicate with the server device 16 via a network NT.

Figure 3:
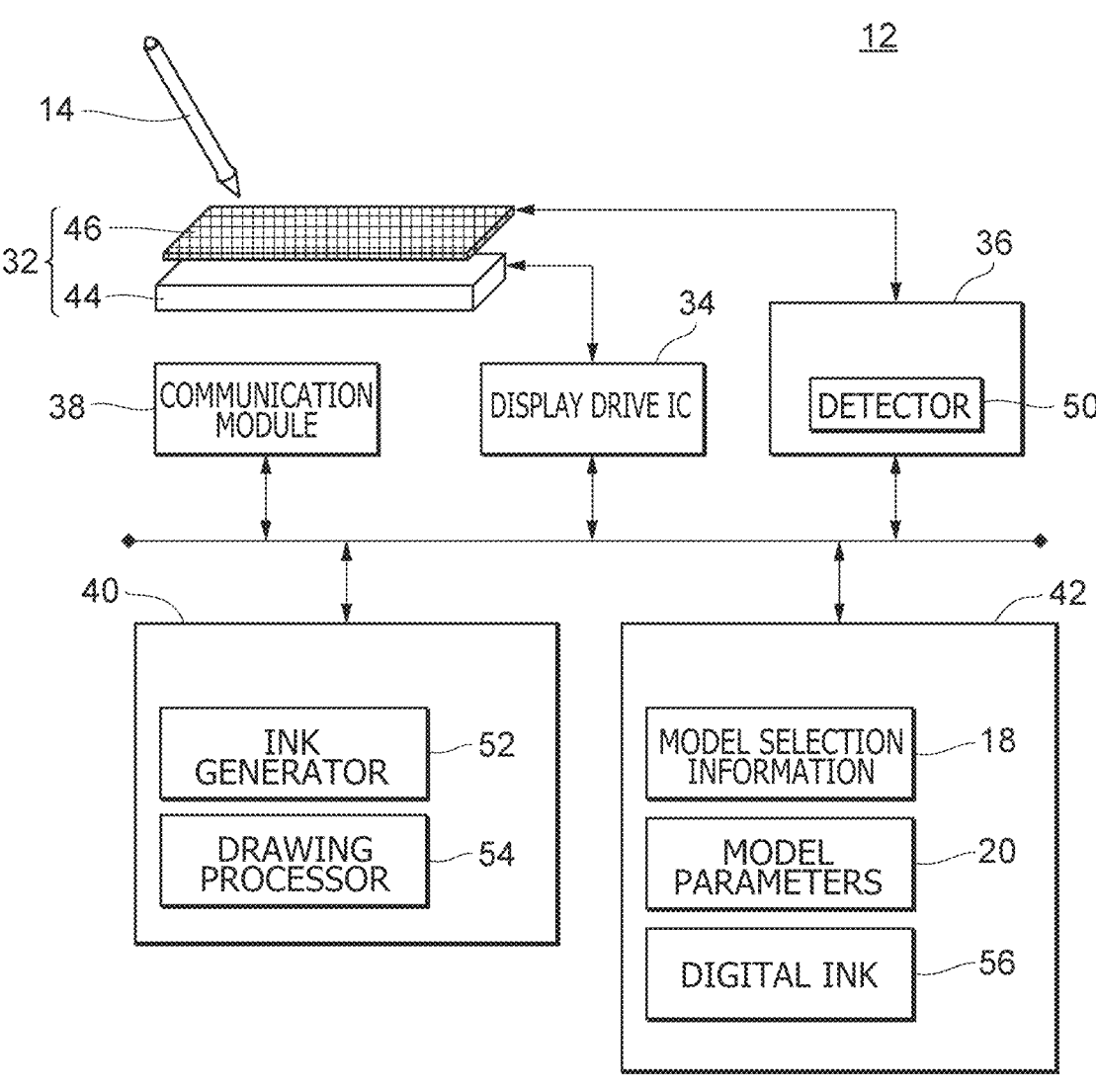
FIG. 3 is a block diagram illustrating an example of a configuration of an electronic device illustrated in FIG. 1.

The electronic device 12 is a general-purpose device or dedicated device including a touch panel display 32 (FIG. 3). Examples of the general-purpose device include a tablet terminal, a smartphone, and a personal computer. Examples of the dedicated device include digital signage (what is called an electronic signboard) and a wearable terminal.

The electronic pen 14 is a pen-type pointing device and can perform one-way or two-way communication with the electronic device 12 via a capacitive coupling formed with the electronic device 12. A user can hold the electronic pen 14 and move it while pressing a pen tip against a predetermined touch surface to draw pictures and write characters on the electronic device 12. The electronic pen 14 is, for example, an active capacitance type (AES) stylus or an electromagnetic resonance (EMR) stylus.

The server device 16 is a computer that performs overall control over the provision of model parameters 20 and may be either a cloud-based computer or an on-premise computer. Although the server device 16 is illustrated here as a stand-alone computer, the server device 16 may be a group of computers building a distributed system instead. The server device 16 specifically includes a server-side communication interface 22, a server-side controller 24, and a server-side storage device 26.

The server-side communication interface 22 is an interface that transmits and receives electrical signals to and from external devices. This allows the server device 16 to receive model selection information 18 from the electronic device 12 and transmit the model parameters 20 to the electronic device 12.

The server-side controller 24 includes an arithmetic processing device including a central processing unit (CPU) and a graphics processing unit (GPU). The server-side controller 24 functions as a model selector 28, which is described in detail later, by reading and executing a program stored in the server-side storage device 26.

The server-side storage device 26 includes a non-transitory and computer-readable storage medium, for example, a hard disk drive (HDD) or a solid state drive (SSD). Accordingly, a database relating to the model parameters 20 (hereinafter referred to as a "parameter DB 30") is built in the server-side storage device 26.

Basic Operations

The input system 10 according to the present embodiment is configured as described above. Operations of the input system 10, specifically, cooperative operations of the electronic device 12, the electronic pen 14, and the server device 16 are described with reference to a sequence diagram of FIG. 2. S1 and S9 in this sequence diagram are cooperatively performed by the electronic pen 14 and the electronic device 12. S4 to S6 are performed by the server device 16. The rest of the acts are performed by the electronic device 12.

Figure 2:
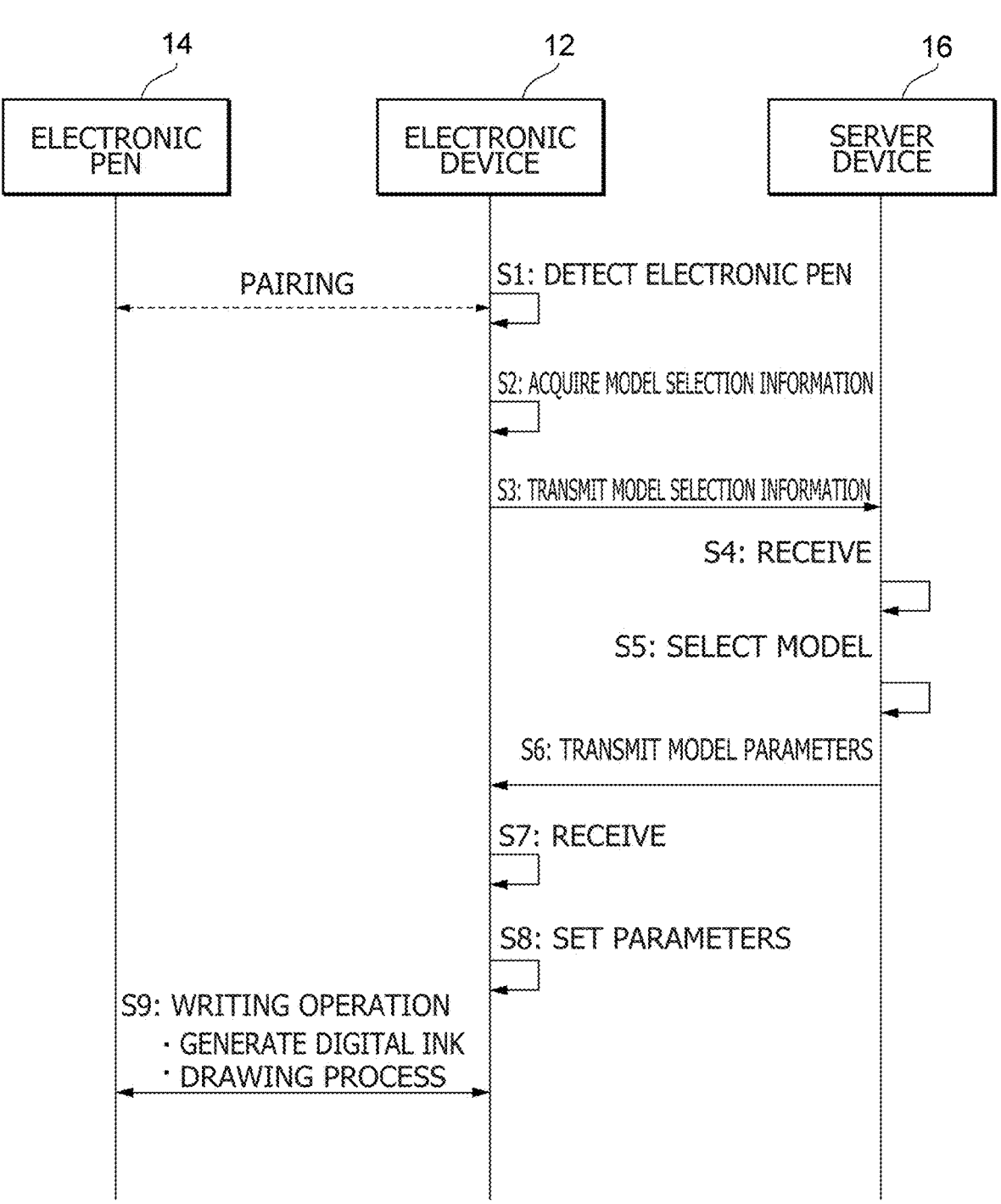
FIG. 2 is a sequence diagram of an operation of the input system illustrated in FIG. 1.

At S1 of FIG. 2, the electronic device 12 detects the electronic pen 14 to be used for a user's writing input. Specifically, the electronic device 12 attempts to pair with the electronic pen 14 in the vicinity of the electronic device 12 itself and detects the electronic pen 14 when pairing is successful. Alternatively, the electronic device 12 may detect the electronic pen 14 by accepting a user's operation of inputting information regarding the electronic pen 14.

At S2, the electronic device 12 acquires the model selection information 18 from the electronic pen 14 and/or the electronic device 12 itself.

At S3, the electronic device 12 transmits data including the model selection information 18 acquired at S2 to the server device 16 with the data associated with identification information (i.e., a device identification (ID)) of the electronic device 12.

At S4, the server device 16 receives the data from the electronic device 12, thereby acquiring the model selection information 18.

At S5, the server-side controller 24 (more specifically, the model selector 28) refers to the parameter DB 30, which is built in the server-side storage device 26, using the model selection information 18 acquired at S4 as a search key. Accordingly, the server-side controller 24 selects, among a plurality of sets of model parameters 20, a set of model parameters 20 with which an input and output model corresponding to the model selection information 18 can be identified.

At S6, the server device 16 transmits the data including the model parameters 20 selected at S5 to the electronic device 12 whose device ID is associated with the corresponding model selection information 18.

At S7, the electronic device 12 receives the data from the server device 16, thereby acquiring the model parameters 20. The model parameters 20 are stored in a memory 42 (FIG. 3) of the electronic device 12.

At S8, the electronic device 12 sets the model parameters 20 acquired at S7 such that the electronic device 12 itself can use the model parameters 20. For example, a host processor 40 (FIG. 3) writes each value of the model parameters 20 to a corresponding memory or register storage region.

At S9, the electronic device 12 performs a desired writing operation in cooperation with the electronic pen 14. Accordingly, the electronic device 12 can perform a process of generating digital ink 56 (FIG. 3) and a drawing process using the digital ink 56 in a state in which the model parameters 20 corresponding to the electronic device 12 are set.

Description of Electronic Device 12

Block Diagram

FIG. 3 is a block diagram illustrating an example of a configuration of the electronic device 12 illustrated in FIG. 1. The electronic device 12 specifically includes the touch panel display 32, a display drive IC 34, a touch IC 36 (equivalent to a "pen state detection circuit"), a communication module 38, the host processor 40, and the memory 42.

The touch panel display 32 includes a display panel 44 and a touch sensor 46. The display panel 44 can visibly display content. The touch sensor 46 has a plane shape and is disposed so as to overlap with the display panel 44 in plan view. In the example of FIG. 3, the touch sensor 46 is an "external" sensor that is externally attached to the display panel 44. Alternatively, the touch sensor 46 may be a sensor of a "built-in type" (further classified into an on-cell type or an in-cell type) that is integrally configured with the display panel 44.

The display panel 44 can display monochrome or color images and includes, for example, a liquid crystal panel, an organic electro-luminescence (EL) panel, or electronic paper. Making the display panel 44 flexible allows the user to perform a handwritten input operation with the touch surface of the electronic device 12 curved or bent.

The touch sensor 46 is a capacitive sensor including a plurality of sensor electrodes 46s (FIG. 6) arranged in a plane shape. The touch sensor 46 includes, for example, a plurality of X line electrodes for detecting the position in an X-direction (first direction) of a sensor coordinate system and a plurality of Y line electrodes for detecting the position in a Y-direction (second direction) that intersects the X-direction. In this case, the X line electrodes, which extend in the Y-direction, are arranged at equal intervals along the X-direction. The Y line electrodes, which extend in the X-direction, are arranged at equal intervals along the Y-direction. Instead of the mutual capacitive sensor described above, a self-capacitive sensor in which block-shaped electrodes are arranged in a two-dimensional grid may be used as the touch sensor 46.

The display drive IC 34 is an integrated circuit that is electrically connected to the display panel 44 and controls the drive of the display panel 44. The display drive IC 34 drives the display panel 44 on the basis of a display signal supplied from the host processor 40. This causes the content indicated by the digital ink 56 to be displayed on the display panel 44.

The touch IC 36 is an integrated circuit that is electrically connected to the touch sensor 46 and controls the drive of the touch sensor 46. In one or more implementations, the touch IC 36 includes a processor and a memory storing instructions that, when executed by the processor, causes the touch IC 36 to perform the acts of the touch IC 36 described herein. The touch IC 36 drives the touch sensor 46 on the basis of a control signal supplied from the host processor 40. With this configuration, the touch IC 36 functions as a detector 50, which performs "pen detection" for detecting a state of the electronic pen 14 and "touch detection" for detecting a touch of a finger or the like of the user.

The "pen detection" function includes, for example, a function of scanning the touch sensor 46, a function of receiving and analyzing a downlink signal, a function of estimating a state (e.g., position, posture, and pen pressure) of the electronic pen 14, and a function of generating and transmitting an uplink signal including a command to the electronic pen 14. The "touch detection" function includes, for example, a function of two-dimensionally scanning the touch sensor 46, a function of acquiring a detection map on the touch sensor 46, and a function of classifying regions on the detection map (e.g., classification of a finger, a palm, and the like).

In this way, combining input functions using the electronic pen 14 and the touch sensor 46 and output functions using the display panel 44 constitute a graphical user interface (GUI).

The communication module 38 has a communication function that performs wired or wireless communication with external devices. This allows the electronic device 12 to transmit the model selection information 18 to the server device 16 and receive the model parameters 20 from the server device 16.

The host processor 40 includes an arithmetic processing device including a CPU, a GPU, or a micro-processing unit (MPU). The host processor 40 functions as an ink generator 52 and a drawing processor 54 by reading and executing an information processing program stored in the memory 42. The ink generator 52 performs a generation process of generating the digital ink 56 on the basis of detection data sequentially supplied from the touch IC 36. The drawing processor 54 performs a drawing process of drawing content in a display region of the display panel 44 using the time series of detection data.

The memory 42 includes a non-transitory and computer-readable recording medium (or storage medium). Here, the computer-readable recording medium is a storage device including an HDD or a portable medium such as an optical magnetic disk, a read only memory (ROM), a compact disc (CD)-ROM, or a flash memory. In the example of FIG. 3, the model selection information 18, the model parameters 20, and the digital ink 56 are stored in the memory 42.

The model selection information 18 is information necessary for selecting an input and output model to be built in the touch IC 36. Specifically, the model selection information 18 includes, for example, [1] identification information relating to at least one of the types of the electronic pen 14, the electronic device 12, and the touch sensor 46, and the user, and [2] specification information relating to the specification of the electronic pen 14 or the electronic device 12.

The model parameters 20 includes a set of parameters describing an input and output model to be built in the touch IC 36. Each value of the model parameters 20 is determined in advance through machine learning. The model parameters 20 include "variable parameters" and "fixed parameters." The "variable parameters" include, for example, coefficients for describing activation functions of arithmetic units and coupling strength between arithmetic units. The "fixed parameters" (what is called hyperparameters) are for specifying the architecture of a learning model. Examples of the hyperparameters include the number of arithmetic units constituting each layer and the number of intermediate layers. For example, if the architecture is fixed, the model parameters 20 may include only variable parameters.

The digital ink 56 is ink data for representing handwritten content. Examples of an "ink description language" for describing the digital ink 56 include a Wacom ink layer language (WILL), an ink markup language (InkML), and an ink serialized format (ISF).
Functional Block of Detector 50

FIG. 4 is a functional block diagram of the detector 50 illustrated in FIG. 3. The detector 50 includes a distribution acquisition section 60, a distribution synthesis section 62, and an estimator 64.

The distribution acquisition section 60 acquires, from the touch sensor 46, a one-dimensional signal distribution (hereinafter also referred to as a "1D signal distribution") indicating a change in capacitance (more precisely, mutual capacitance or self-capacitance) with the approach of the electrode of the electronic pen 14. The 1D signal distribution corresponds to a cross-sectional shape of a two-dimensional map detected on the touch sensor 46. In order to distinguish the types of 1D signal distribution, a signal distribution along the X-direction on the touch sensor 46 may be referred to as an "X signal distribution" while a signal distribution along the Y-direction on the touch sensor 46 may be referred to as a "Y signal distribution."

The distribution synthesis section 62 generates a two-dimensional signal distribution (hereinafter also referred to as a "2D signal distribution") by synthesizing the X signal distribution and Y signal distribution acquired by the distribution acquisition section 60. Specifically, [1] the distribution synthesis section 62 performs an interpolation arithmetic operation on the X signal distribution to obtain a signal value corresponding to an X coordinate to be calculated (hereinafter also referred to as a "first corresponding value"). [2] The distribution synthesis section 62 performs an interpolation arithmetic operation on the Y signal distribution to obtain a signal value corresponding to a Y coordinate to be calculated (hereinafter also referred to as a "second corresponding value"). [3] The distribution synthesis section 62 synthesizes (specifically, multiplies, adds, etc.) the first corresponding value and the second corresponding value.

The distribution synthesis section 62 may, if necessary, calculate features relating to the shape of each one-dimensional signal distribution (hereinafter also referred to as a "one-dimensional feature distribution" or a "1D feature distribution") and synthesize the 1D feature distributions with each other. In this case, synthesizing an "X feature distribution" corresponding to the X signal distribution and a "Y feature distribution" corresponding to the Y signal distribution generates a two-dimensional feature distribution (hereinafter also referred to as a "2D feature distribution"). The feature distributions are synthesized in a similar manner to the signal distributions described above. Examples of the features include various features, such as the gradient of the signal distribution or the absolute value of the gradient, that characterize the shape of the signal distribution.

The estimator 64 estimates the state of the electronic pen 14 (hereinafter also referred to as "pen state") from the 2D signal distribution or 2D feature distribution synthesized by the distribution synthesis section 62. The pen state includes [1] the position indicated by the electronic pen 14 (e.g., coordinate values on the sensor coordinate system), [2] the posture of the electronic pen 14 (e.g., angle and orientation), and [3] the amount of time variation of the indicated position and posture (e.g., speed and acceleration). The estimator 64 includes a learner whose arithmetic rules are defined by each value of the model parameters 20 (FIG. 1). The estimator 64 specifically functions as a feature map generation section 66, a data output section 68, and a data interpretation section 70.

The feature map generation section 66 generates a feature map from the 2D signal distribution or 2D feature distribution. The feature map indicates the features relating to the shape of the distribution. This feature map includes voxel data of any size (the number of X pixels/the number of Y pixels/the number of channels).

The data output section 68 outputs data indicating the result of estimating the position indicated by the electronic pen 14 or the posture of the electronic pen 14 from the feature map generated by the feature map generation section 66 (hereinafter referred to as "output data"). The output data may be defined as an absolute value (e.g., 100 mm) or relative value (e.g., a value normalized in the range of [0, 1]) indicating the position indicated by the electronic pen 14 or the posture of the electronic pen 14.

The data interpretation section 70 interprets the contents of the output data from the data output section 68 and calculates the position indicated by the electronic pen 14 or the posture of the electronic pen 14. For example, if the value of the output data is a relative value indicating the coordinates of the indicated position, the data interpretation section 70 calculates the absolute value of the indicated position or the posture by adding or multiplying an offset value indicating a reference value. As a result, the data interpretation section 70 acquires the position/posture information of the electronic pen 14.

Pen State Detection Operation

A pen state detection operation by the touch IC 36 of FIG. 3 (more specifically, the detector 50 of FIGS. 3 and 4) is described with reference to the functional block diagram of FIG. 4, a flowchart of FIG. 5, and FIGS. 6 to 11.

At SP10 of FIG. 5, the detector 50 checks whether a detection timing has arrived or not. If the detection timing has not yet arrived (SP10: NO), the detector 50 remains at SP10 until the timing arrives. If the detection timing has arrived (SP10: YES), the detector 50 proceeds to the next SP12.

At SP12, the distribution acquisition section 60 acquires each of the X signal distribution and the Y signal distribution from the touch sensor 46 through scanning of each sensor electrode 46*s*. Here, the X signal distribution is taken as an example.

Figure 6:
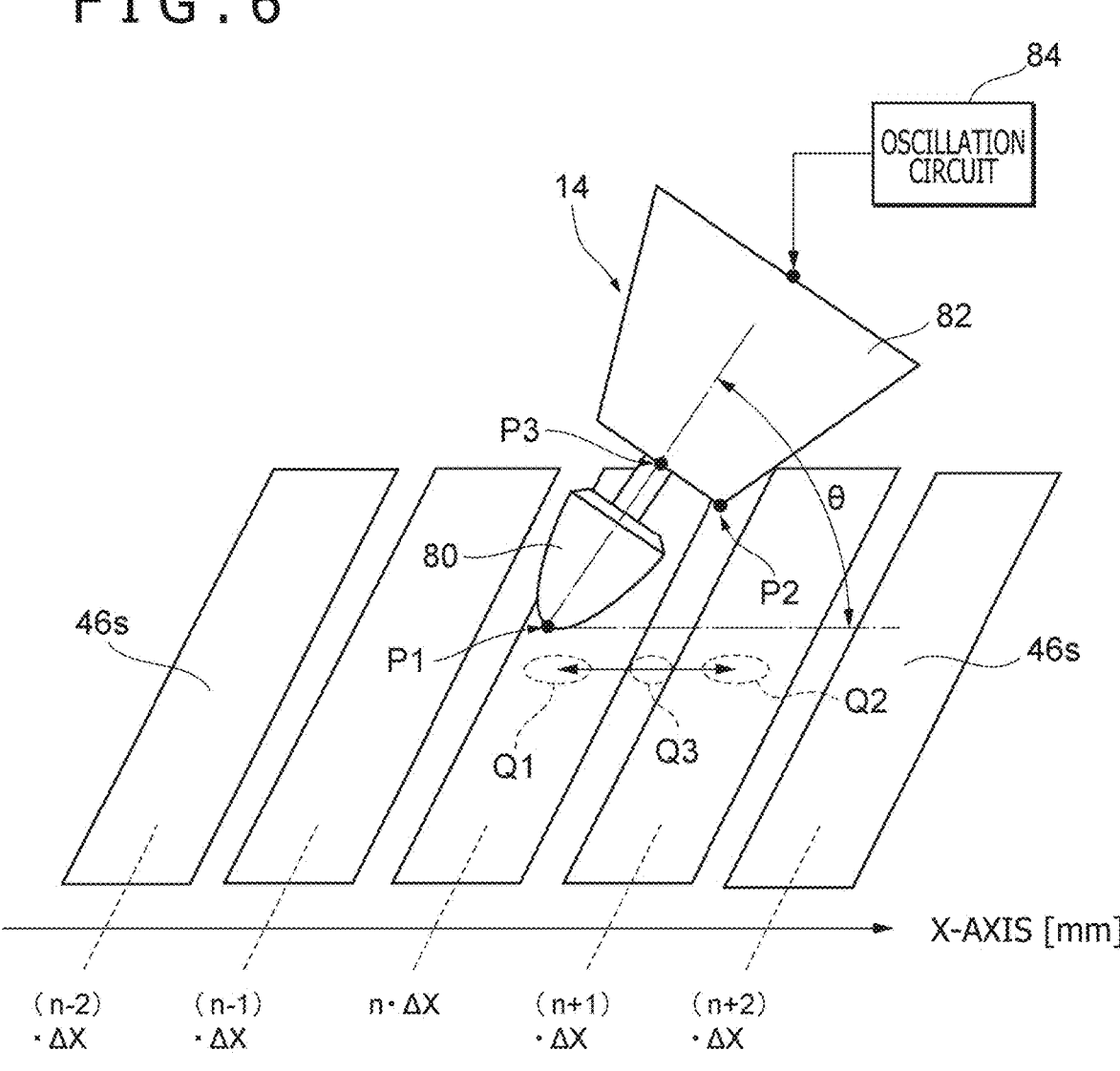
FIG. 6 is a schematic diagram partially illustrating an electronic pen illustrated in FIGS. 1 and 3.

FIG. 6 is a schematic diagram partially illustrating the electronic pen 14 illustrated in FIGS. 1 and 3. A tip electrode 80, which has a substantially cone shape, and an upper electrode 82, which has a shape of a bottomless truncated cone, are coaxially disposed at a distal end of the electronic pen 14. Each of the tip electrode 80 and the upper electrode 82 is a pen-side electrode for outputting a signal (what is called a downlink signal) generated by an oscillation circuit 84. In response to the oscillation circuit 84 changing an oscillation frequency or switching a transmission destination in a time-division manner, the electronic pen 14 can output two types of downlink signals via the tip electrode 80 and the upper electrode 82.

The touch IC 36 (FIG. 3) acquires, from the plurality of sensor electrodes 46*s*, a signal distribution indicating a change in capacitance with the approach of the tip electrode 80 (hereinafter referred to as a "tip-side signal distribution"). The tip-side signal distribution typically has a shape with one peak at a position Q1. Here, the position Q1 corresponds to the position at which a top (position P1) of the tip electrode 80 is projected onto a sensor plane.

Similarly, the touch IC 36 acquires, from the plurality of sensor electrodes 46*s*, a signal distribution indicating a change in capacitance with the approach of the upper electrode 82 (hereinafter referred to as an "upper-side signal distribution"). The upper-side signal distribution typically has a shape with one or two peaks at a position Q2. Here, the position Q2 corresponds to the position at which a shoulder (position P2) of the upper electrode 82 is projected onto the sensor plane. In addition, a position Q3 described later corresponds to the position at which the center (position P3) of an upper bottom surface of the upper electrode 82 is projected onto the sensor plane.

FIG. 7 is a graph illustrating an example of the 1D signal distribution acquired from the touch sensor 46. A horizontal axis of the graph represents the line number (i.e., the identification number of each sensor electrode 46*s*), while a vertical axis of the graph represents a signal value. Here, assume a situation in which two electronic pens 14 are detected simultaneously. In this case, the 1D signal distribution has two narrow peaks each centered on the position indicated by the corresponding electronic pen 14. The remaining positions other than those two peaks have zero or small signal values. Hereinafter, the entire 1D signal distribution may also be referred to as the "entire distribution," while a local 1D signal distribution with a relatively large change in capacitance may also be referred to as a "local distribution." The term "relatively large" may mean that the amount of change is larger than that of the positions other than the local distribution or that the amount of change is larger than a predetermined threshold value.

Figure 9:
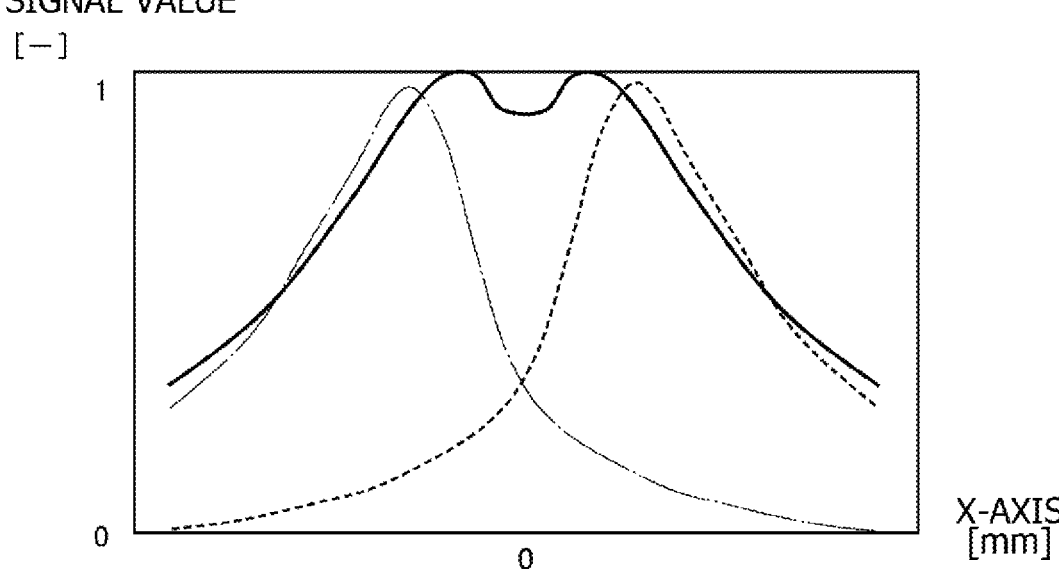
FIG. 9 is a graph illustrating an example of the local distribution detected from the touch sensor when the electronic pen is in contact with the touch sensor.

FIGS. 8 and 9 are graphs illustrating an example of the 1D signal distribution detected from the touch sensor 46 when the electronic pen 14 is in contact with the touch sensor 46. Specifically, FIG. 8 illustrates tip-side local distributions, while FIG. 9 illustrates upper-side local distributions. A horizontal axis of the graph represents a relative position (unit: mm) based on the position indicated by the electronic pen 14. A vertical axis of the graph represents a signal value (unit: none) normalized to [0, 1]. The positive and negative signs are defined such that the signal value becomes "positive" when the electronic pen 14 approaches. The shapes of both signal distributions change according to the tilt angle of the electronic pen 14. FIGS. 8 and 9 illustrate three curves in a superimposed manner. These curves are the results of changing the tilt angle.

As illustrated in FIG. 8, the tip-side local distributions have a substantially similar shape regardless of the magnitude of the tilt angle. This is because, during the use of the electronic pen 14, the top of the tip electrode 80 is usually closest to the sensor plane and the position Q1 substantially matches the position P1. By contrast, as illustrated in FIG. 9, in the case of the upper-side local distributions, the position of the peak or the number of peaks changes greatly according to the change of the tilt angle. This is because, during the use of the electronic pen 14, any of portions of the shoulder of the upper electrode 82 is usually closest to the sensor plane and the distance between the positions Q1 and Q2 changes according to the tilt angle.

The coordinates of the positions Q1 and Q2 can be used to estimate the position/posture (i.e., pen state) of the electronic pen 14. For example, the indicated position corresponds to the position Q1 illustrated in FIG. 7. The tilt angle corresponds to an angle θ between the sensor plane and an axis of the electronic pen 14. Specifically, θ=0° when the electronic pen 14 is horizontal to the sensor plane, while θ=90° when the electronic pen 14 is vertical to the sensor plane.

At SP14 of FIG. 5, the distribution synthesis section 62 generates a 2D signal distribution by synthesizing the X signal distribution and Y signal distribution acquired at SP12. Alternatively, the distribution synthesis section 62 generates a 2D feature distribution by acquiring the X feature distribution relating to the X signal distribution and the Y feature distribution relating to the Y signal distribution and synthesizing the X feature distribution and the Y feature distribution.

Figure 10:
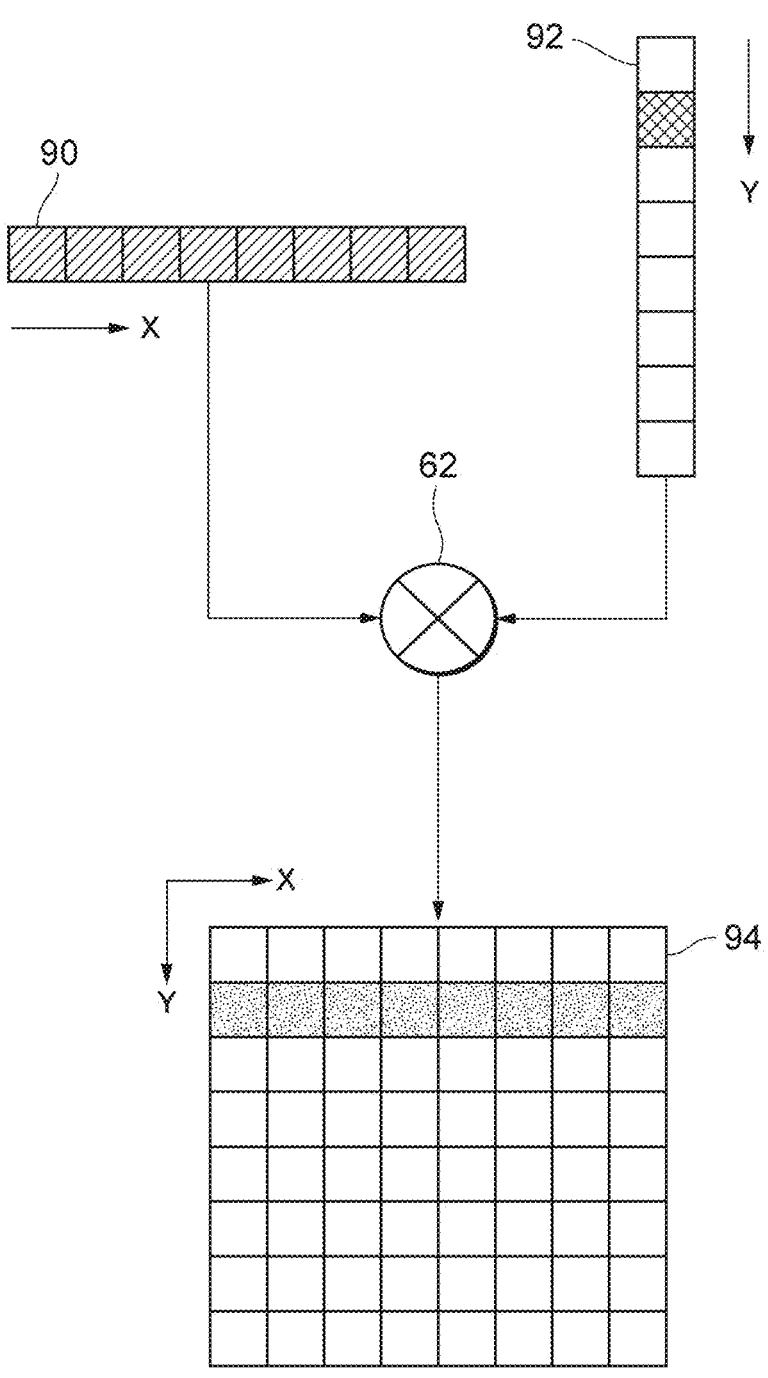
FIG. 10 is a diagram illustrating an example of a method for synthesizing 1D signal distributions.

FIG. 10 illustrates an example of a method for synthesizing the 1D signal distributions. A first table 90 represents the entire distribution or the local distribution in the X-direction. A second table 92 represents the entire distribution or the local distribution in the Y-direction. Cells constituting the first table 90 represent the position (absolute or relative coordinates) on the X-axis. Cells constituting the second table 92 represent the position (absolute or relative coordinates) on the Y-axis.

In the example of FIG. 10, the distribution synthesis section 62 includes a multiplier that multiplies a "first input value" acquired by referring to the first table 90 by a "second input value" acquired by referring to the second table 92 and outputs a resulting multiplied value. The distribution synthesis section 62 calculates and arranges a multiplied value for each position on the X-axis and each position on the Y-axis, thereby acquiring a map 94, which indicates a two-dimensional signal distribution.

Figure 11A:
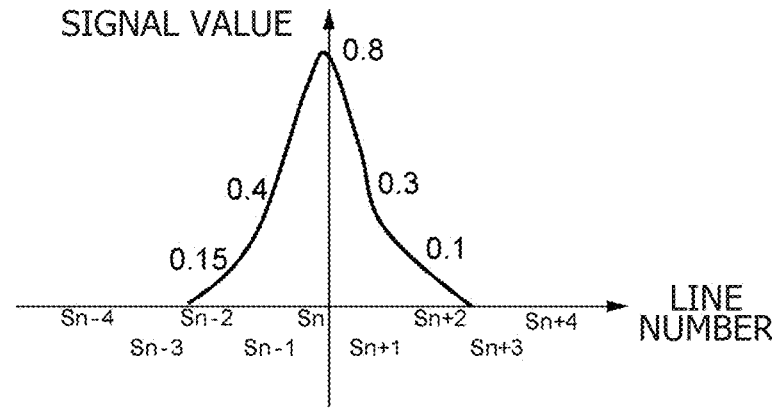
FIGS. 11A to 11C are graphs illustrating an example of a method for calculating a 1D feature distribution.
Figure 11B:
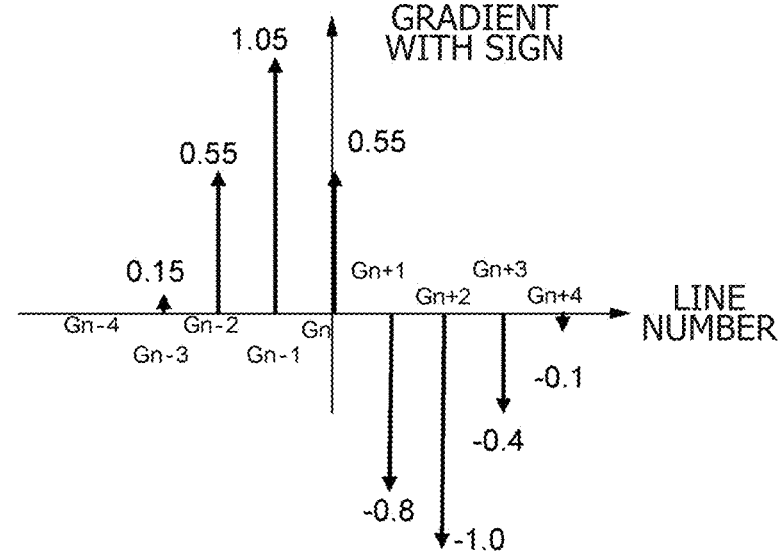
Figure 11C:
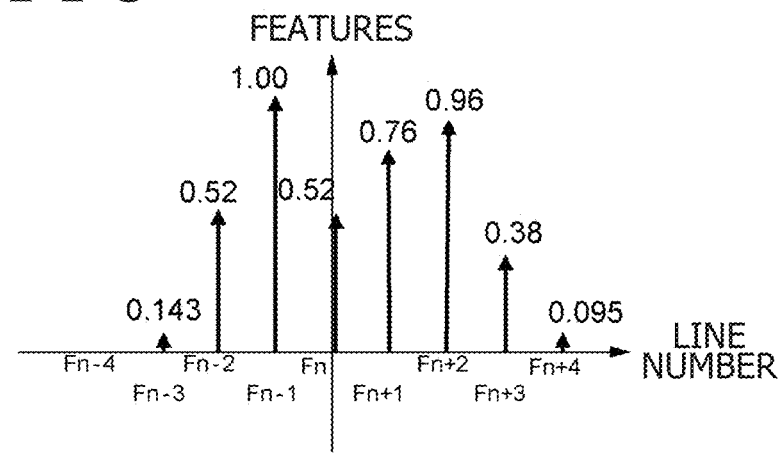

FIGS. 11A to 11C are graphs illustrating an example of a method for calculating the 1D feature distribution. As illustrated in FIG. 11A, a signal distribution with $S_{n-2}=0.15/S_{n-}$ 1=0.40/$S_n$=0.80/$S_{n+1}$=0.30/$S_{n+2}$=0.10 starting from the youngest line number is assumed to be acquired. The signal values in the other line numbers are all 0 or negligibly small. For example, {$G_i$} and {$F_i$} are calculated according to the following equations (1) and (2), respectively.

$$G_i = (S_i - S_{i-2}) + (S_{i-1} - S_{i-3}) \qquad (1)$$

$$F_i = |G_i|/\max\{|G_i|\} \qquad (2)$$

As a result, "gradient with sign" {$G_i$} illustrated in FIG. 11B and features {$F_i$} illustrated in FIG. 11C are calculated. As understood from the equation (2), the features {Fi} correspond to "gradient without sign" normalized in the range of [0, 1].

At SP16 of FIG. 5, the estimator 64 (more specifically, the feature map generation section 66) generates a feature map for estimating the pen state from the 2D signal distribution synthesized at SP14.

At SP18, the estimator 64 (more particularly, the data output section 68) generates and outputs data (i.e., output data) correlating with the indication/posture of the electronic pen 14 from the feature map generated at SP16.

At SP20, the estimator 64 (more particularly, the data interpretation section 70) converts the output data output at SP18 into position/posture information indicating the position/posture of the electronic pen 14.

After that, returning to SP10, the detector 50 sequentially performs SP10 to SP20 according to a predetermined order. As a result, the detector 50 successively detects the position indicated by the electronic pen 14 and the posture of the electronic pen 14.

Specific Examples of Input and Output Models 64A to 64D

Next, specific examples of input and output models 64A to 64D for estimating the state of the electronic pen 14 are described in detail with reference to FIGS. 12 to 15. Each non-filled circle illustrated in FIGS. 12 to 15 corresponds to an arithmetic unit constituting a neural network.

First Example

FIG. 12 is a diagram illustrating a network structure constituting the input and output model 64A according to a first example. The input and output model 64A includes what is called a convolutional neural network (CNN). The input and output model 64A includes an input layer 100, an intermediate layer group 102, and an output layer 104.

The input layer 100 includes Nx·Ny arithmetic units for receiving an upper-side 2D signal distribution. "Nx" corresponds to the number of pixels in the X-direction while "Ny" corresponds to the number of pixels in the Y-direction. In the first example, the 2D signal distribution is represented as image signals whose number of color channels is one.

The intermediate layer group 102 includes one or more intermediate layers. Specifically, in the first example, the intermediate layer group 102 includes four intermediate layers 102a, 102b, 102c, and 102d, which are connected in series. Each intermediate layer includes, for example, one of the following arithmetic layers: [1] a convolutional layer, [2] a pooling layer, and [3] a normalization layer. A feature map from the intermediate layer 102d is flattened (made into one dimension) before supplied to the output layer 104.

The output layer 104 includes two arithmetic units for outputting the position indicated by the electronic pen 14. One of the arithmetic units outputs a relative value of the X coordinate, while the other arithmetic unit outputs a relative value of the Y coordinate. The relative values are, for example, values normalized to [0, 1] in the range from a lower limit to an upper limit.

In this way, the input and output model 64A may be a machine learning model including a convolutional neural network that receives, as an input, a 2D signal distribution or a 2D feature distribution and outputs coordinate values indicating the position indicated by the electronic pen 14. With the configuration of the first example, the input and output model 64A can estimate the position indicated by the electronic pen 14 with higher accuracy based on the upper-side 2D signal distribution.

Second Example

Figure 13:
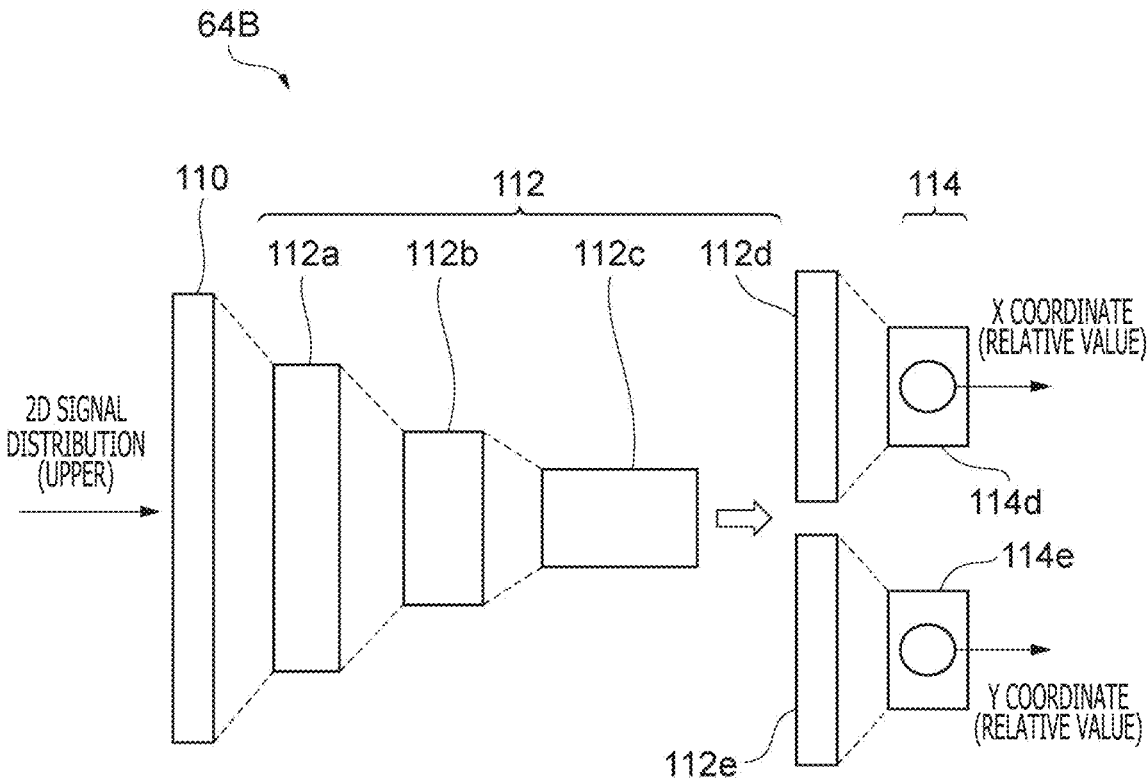
FIG. 13 is a diagram illustrating a network structure constituting an input and output model according to a second example.

FIG. 13 is a diagram illustrating a network structure constituting the input and output model 64B according to a second example. The input and output model 64B has a different network structure from that of the first example (the input and output model 64A of FIG. 12) in that the output side has two branches.

Specifically, the input and output model 64B includes an input layer 110, an intermediate layer group 112, and an output layer group 114. The input layer 110 includes Nx·Ny arithmetic units for receiving an upper-side 2D signal distribution, as in the case of the first example (the input layer 100 of FIG. 12).

The intermediate layer group 112 includes a plurality of intermediate layers. Specifically, in the second example, the intermediate layer group 112 includes five intermediate layers 112a, 112b, 112c, 112d, and 112e. The three intermediate layers 112a to 112c in the first stage are connected in series. The two intermediate layers 112d and 112e in the latter stage are connected in parallel to the output side of the intermediate layer 112c located on the upstream side.

The output layer group 114 includes an output layer 114d, which is connected to the intermediate layer 112d, and an output layer 114e, which is connected to the intermediate layer 112e. The output layer 114d includes one arithmetic unit for outputting a "relative value of the X coordinate," which is the position indicated by the electronic pen 14. The output layer 114e includes one arithmetic unit for outputting a "relative value of the Y coordinate," which is the position indicated by the electronic pen 14.

In this way, the input and output model 64B may be a machine learning model including a convolutional neural network that receives, as an input, a 2D signal distribution or a 2D feature distribution and outputs coordinate values indicating the position indicated by the electronic pen 14. With the configuration of the second example, as with the first example, the input and output model 64B can estimate the position indicated by the electronic pen 14 with higher accuracy based on the upper-side 2D signal distribution.

Third Example

Figure 14:
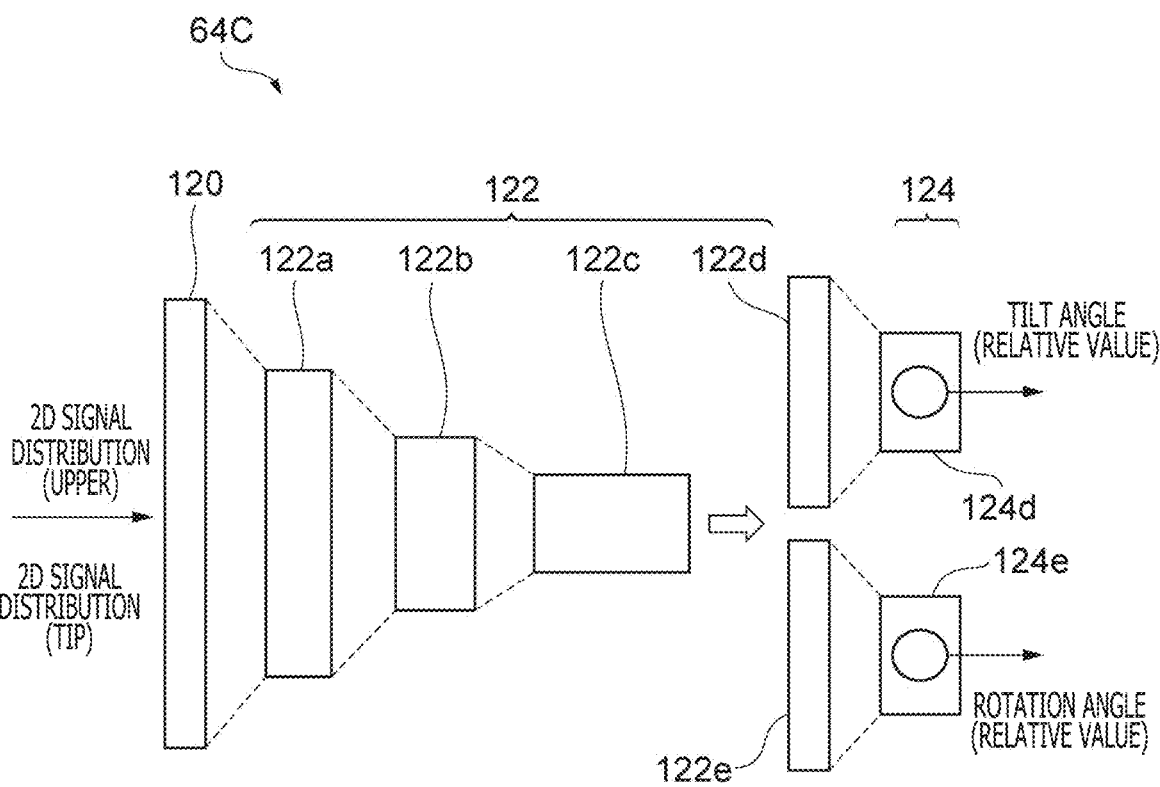
FIG. 14 is a diagram illustrating a network structure constituting an input and output model according to a third example.

FIG. 14 is a diagram illustrating a network structure constituting the input and output model 64C according to a third example. The input and output model 64C includes an input layer 120, an intermediate layer group 122, and an output layer group 124.

As with the first and second examples, the input layer 120 includes Nx·Ny arithmetic units for receiving a 2D signal distribution. However, input signals in the third example are image signals with two color channels. For example, the first color channel corresponds to an upper-side 2D signal distribution and the second color channel corresponds to a tip-side 2D signal distribution.

As with the second example (the intermediate layer group 112 of FIG. 13), the intermediate layer group 122 includes five intermediate layers 122a, 122b, 122c, 122d, and 122e. The two intermediate layers 122d and 122e in the latter stage are connected in parallel to the output side of the intermediate layer 122c located on the upstream side.

The output layer group 124 includes an output layer 124d, which is connected to the intermediate layer 122d, and an output layer 124e, which is connected to the intermediate layer 122e. The output layer 124d includes one arithmetic unit for outputting a "relative value of the tilt angle," which is the posture of the electronic pen 14. The output layer 124e includes one arithmetic unit for outputting a "relative value of the rotation angle," which is the posture of the electronic pen 14.

In this way, the input and output model 64C may be a machine learning model including a convolutional neural network that receives, as inputs, 2D signal distributions or 2D feature distributions and outputs at least one of the tilt angle or rotation angle indicating the posture of the electronic pen 14. With the configuration of the third example, the above-described input and output model 64C can estimate the posture of the electronic pen 14 with high accuracy based on the combination of the upper-side 2D signal distribution and the tip-side 2D signal distribution.

Fourth Example

Figure 15:
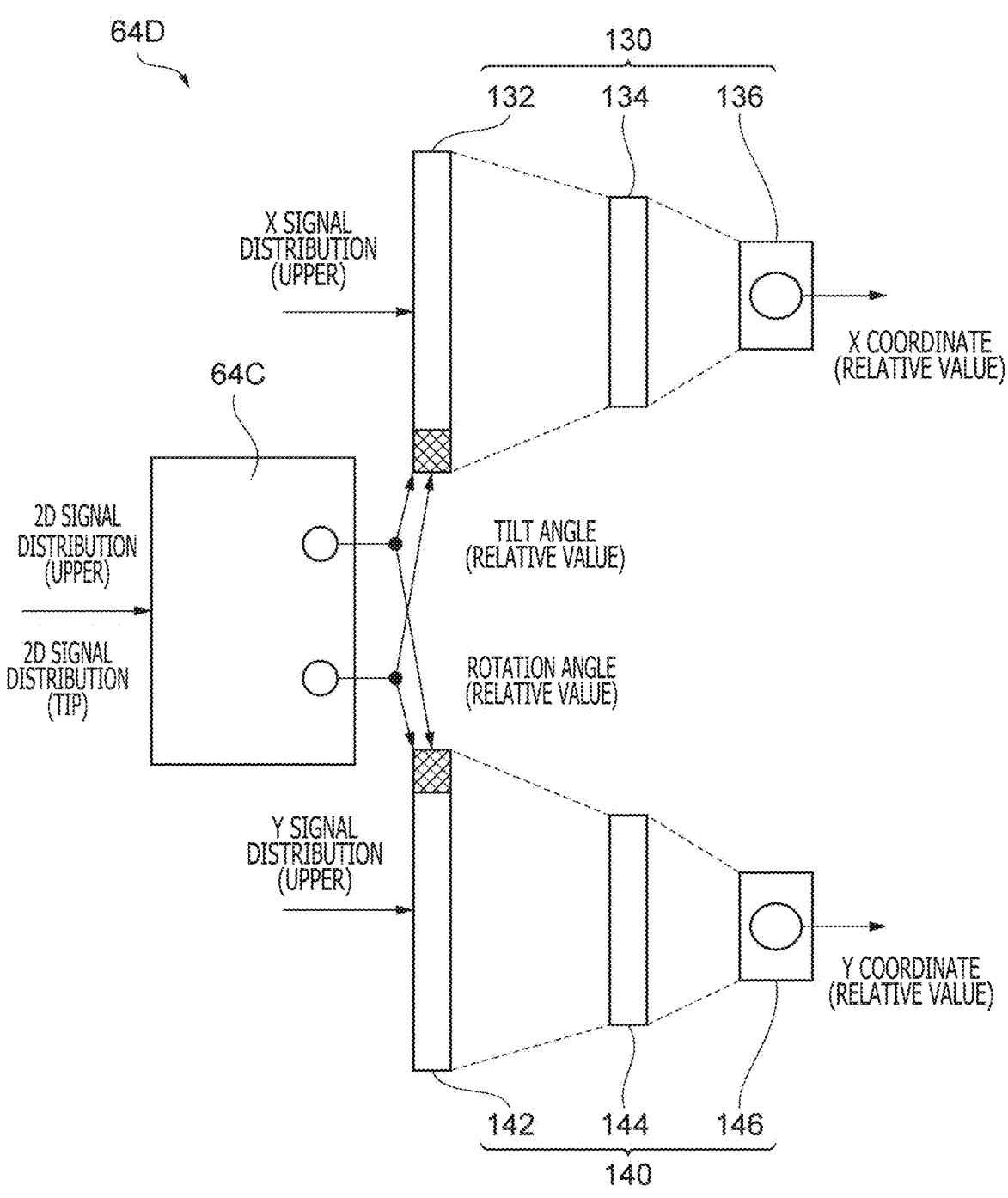
FIG. 15 is a diagram illustrating a network structure constituting an input and output model according to a fourth example.

FIG. 15 is a diagram illustrating a network structure constituting the input and output model 64D according to a fourth example. The input and output model 64D includes the input and output model 64C (FIG. 14) illustrated in the third example. Specifically, the input and output model 64D includes, in addition to the input and output model 64C, two sub-models 130 and 140, which are connected in parallel to the output side of the input and output model 64C.

The sub-model 130 includes a hierarchical neural network including an input layer 132, an intermediate layer group 134, and an output layer 136. The input layer 132 includes (Nx+2) arithmetic units for receiving [1] an upper-side X signal distribution and [2] angle estimation values. The X signal distribution is the same as the distribution from which the 2D signal distribution input into the input and output model 64C has been generated. The angle estimation values are the same as estimation values of the tilt angle and rotation angle output from the input and output model 64C.

The intermediate layer group 134 includes one or more intermediate layers. The output layer 136 includes one arithmetic unit for outputting a "relative value of the X coordinate," which is the position indicated by the electronic pen 14.

As with the sub-model 130, the sub-model 140 includes a hierarchical neural network including an input layer 142, an intermediate layer group 144, and an output layer 146. The input layer 142 includes (Ny+2) arithmetic units for receiving [1] an upper-side Y signal distribution and [2] angle estimation values. The Y signal distribution is the same as the distribution from which the 2D signal distribution input into the input and output model 64C has been generated. The angle estimation values are the same as the estimation values of the tilt angle and rotation angle output from the input and output model 64C.

The intermediate layer group 144 includes one or more intermediate layers. The output layer 146 includes one arithmetic unit for outputting a "relative value of the Y coordinate," which is the position indicated by the electronic pen 14.

In this way, the input and output model 64D may be a machine learning model including the input and output model 64C of FIG. 14. In other words, connecting the sub-models 130 and 140 to the input and output model 64C may build the new input and output model 64D. With the configuration of the fourth example, the input and output model 64D can estimate the posture of the electronic pen 14 and the position indicated by the electronic pen 14 with high accuracy based on the combination of the 1D signal distributions and the 2D signal distributions or the combination of the 1D feature distributions and the 2D feature distributions.

For example, the sub-model 130 may be a first hierarchical neural network that receives, as inputs, at least one of the tilt angle or rotation angle output from the input and output model 64C and an X signal distribution or an X feature distribution and outputs an X coordinate value indicating the position indicated by the electronic pen 14. The sub-model 140 may be a second hierarchical neural network that receives, as inputs, at least one of the tilt angle or rotation angle output from the input and output model 64C and a Y signal distribution or a Y feature distribution and outputs a Y coordinate value indicating the position indicated by the electronic pen 14.

Summary of Embodiment

As described above, the pen state detection circuit (in the present embodiment, the touch IC 36) according to the present embodiment detects the state of the electronic pen 14, which includes at least one electrode, on the basis of a signal distribution detected by the capacitive touch sensor 46, which includes the plurality of sensor electrodes 46s arranged in a plane shape.

Further, the touch IC 36 performs an acquisition (SP12 of FIG. 5), from the touch sensor 46, an X signal distribution along the first direction (X-direction) on the touch sensor 46 and a Y signal distribution along the second direction (Y-direction) intersecting the first direction, each of the X signal distribution and the Y signal distribution being a one-dimensional signal distribution indicating a change in capacitance with the approach of the electrode, a synthesis (SP14) of generating a 2D signal distribution by synthesizing the acquired X signal distribution and Y signal distribution or generating a 2D feature distribution by synthesizing an X feature distribution relating to the shape of the X signal distribution and a Y feature distribution relating to the shape of the Y signal distribution, and an estimation (SP16 to SP20), using the predetermined input and output models 64A to 64D, the position indicated by the electronic pen 14 or the posture of the electronic pen 14 from the 2D signal distribution or 2D feature distribution.

This configuration can improve the accuracy of the estimation of the pen state of the electronic pen 14 including at least one electrode. In particular, since the 2D signal distribution (or the 2D feature distribution) is calculated by synthesizing the X signal distribution and the Y signal distribution (or the X feature distribution and the Y feature distribution), it is possible to reduce the amount of data handled compared to acquiring the 2D signal distribution from the touch sensor 46. This increases the speed of arithmetic processing accordingly.

In the synthesis, the touch IC 36 may generate the 2D signal distribution by multiplying a first corresponding value corresponding to the position in the X-direction in the X signal distribution by a second corresponding value corresponding to the position in the Y-direction in the Y signal distribution. Alternatively, in the synthesis, the touch IC 36 may generate the 2D feature distribution by multiplying a first corresponding value corresponding to the position in the X-direction in the X feature distribution by a second corresponding value corresponding to the position in the Y-direction.

When the electronic pen 14 includes a plurality of electrodes, the 2D signal distribution or the 2D feature distribution may include image signals with a plurality of color channels corresponding to the electrodes. In particular, the electronic pen 14 may include at least the tip electrode 80, which is symmetrical about the axis of the electronic pen 14 and is disposed at the distal end of the electronic pen 14, and the upper electrode 82, which is symmetrical about the axis of the electronic pen 14 and is disposed closer to a proximal end of the electronic pen 14 than the tip electrode 80 is. This configuration enables highly accurate estimation of the posture (e.g., the tilt angle and the rotation angle) of the electronic pen 14.

The input system 10 according to the present embodiment also includes the electronic device 12 including the pen state detection circuit (in the present embodiment, the touch IC 36), the electronic pen 14 used with the electronic device 12, and the server device 16, which can bi-directionally communicate with the electronic device 12 and store the model parameters 20 describing the input and output models 64A to 64D to be built in the touch IC 36. When the electronic pen 14 is detected, the electronic device 12 may request the server device 16 to transmit the model parameters 20 corresponding to the electronic pen 14. This allows the electronic device 12 to automatically use the input and output models 64A to 64D corresponding to the electronic pen 14.

Modifications

The present disclosure is not limited to the embodiment described above, and it is a matter, needless to say, that any changes can be made to the present disclosure without departing from the scope of the present disclosure. The configurations described in the embodiment may also be optionally combined as long as no technical inconsistency arises. The order of execution of each included in the flowcharts may also be changed as long as no technical inconsistency arises.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A pen state detection system for detecting a state of an electronic pen based on a signal distribution detected by a touch sensor including a plurality of sensor electrodes arranged in a plane shape, the electronic pen including at least one electrode that transmits at least one signal, the pen state detection system comprising:

a processor; and a memory storing instructions which, when executed by the processor, cause the pen state detection system to:

acquire, from the touch sensor, a first signal distribution along a first direction on the touch sensor and a second signal distribution along a second direction intersecting the first direction, each of the first signal distribution and the second signal distribution being a one-dimensional signal distribution corresponding to the at least one signal transmitted by the at least one electrode, generate a two-dimensional signal distribution by synthesizing the first signal distribution and second signal distribution, or generate a two-dimensional feature distribution by synthesizing a first feature distribution relating to a shape of the first signal distribution and a second feature distribution relating to a shape of the second signal distribution, and estimate, using an input and output model, a position indicated by the electronic pen or a posture of the electronic pen from the two-dimensional signal distribution or two-dimensional feature distribution.

2. The pen state detection system according to claim 1, wherein, in the synthesizing, the pen state detection system generates the two-dimensional signal distribution by multiplying a first corresponding value corresponding to a position in the first direction in the first signal distribution by a second corresponding value corresponding to a position in the second direction in the second signal distribution, or generates the two-dimensional feature distribution by multiplying a first corresponding value corresponding to a position in the first direction in the first feature distribution by a second corresponding value corresponding to a position in the second direction in the second feature distribution.

3. The pen state detection system according to claim 1, wherein the input and output model is a machine learning model including a convolutional neural network which, in operation, receives, as an input, the two-dimensional signal distribution or the two-dimensional feature distribution and outputs coordinate values indicating the position indicated by the electronic pen.

4. The pen state detection system according to claim 1, wherein the input and output model is a machine learning model including a convolutional neural network which, in operation, receives, as an input, the two-dimensional signal distribution or the two-dimensional feature distribution and outputs at least one of a tilt angle or rotation angle indicating the posture of the electronic pen.

5. The pen state detection system according to claim 1, wherein the input and output model is a machine learning model including:

a convolutional neural network which, in operation, receives, as an input, the two-dimensional signal distribution or the two-dimensional feature distribution and outputs at least one of a tilt angle or rotation angle indicating the posture of the electronic pen, a first hierarchical neural network which, in operation, receives, as input, at least one of the tilt angle or rotation angle output from the convolutional neural network and the first signal distribution or the first feature distribution and outputs a coordinate value in the first direction indicating the position indicated by the electronic pen, and a second hierarchical neural network which, in operation, receives, as input, at least one of the tilt angle or rotation angle output from the convolutional neural network and the second signal distribution or the second feature distribution and outputs a coordinate value in the second direction indicating the position indicated by the electronic pen.

6. The pen state detection system according to claim 1, wherein the at least one electrode includes a plurality of electrodes, and wherein the two-dimensional signal distribution or the two-dimensional feature distribution includes image signals with a plurality of color channels corresponding to the electrodes.

7. The pen state detection system according to claim 6, wherein the at least one electrode includes:

a tip electrode that, in operation, transmits a first signal; and an upper electrode that is disposed farther from a tip of the electronic pen than the tip electrode, wherein the upper electrode that, in operation, transmits a second signal.

8. The pen state detection system according to claim 7, wherein each of the first signal distribution and the second signal distribution is a one-dimensional signal distribution corresponding to the second signal transmitted by the upper electrode.

9. A pen state detection method for detecting a state of an electronic pen based on a signal distribution detected by a touch sensor including a plurality of sensor electrodes arranged in a plane shape, the electronic pen including at least one electrode that transmits at least one signal, the pen state detection method being performed by one or more processors, the pen state detection method comprising:

acquiring, from the touch sensor, a first signal distribution along a first direction on the touch sensor and a second signal distribution along a second direction intersecting the first direction, each of the first signal distribution and the second signal distribution being a one-dimensional signal distribution corresponding to the at least one signal transmitted by the at least one electrode;

generating a two-dimensional signal distribution by synthesizing the first signal distribution and second signal distribution, or generating a two-dimensional feature distribution by synthesizing a first feature distribution relating to a shape of the first signal distribution and a second feature distribution relating to a shape of the second signal distribution; and estimating, using an input and output model, a position indicated by the electronic pen or a posture of the electronic pen from the two-dimensional signal distribution or two-dimensional feature distribution.

10. The pen state detection method according to claim 9, wherein the at least one electrode includes:

a tip electrode that, in operation, transmits a first signal; and an upper electrode that is disposed farther from a tip of the electronic pen than the tip electrode, wherein the upper electrode that, in operation, transmits a second signal.

11. The pen state detection method according to claim 10, wherein each of the first signal distribution and the second signal distribution is a one-dimensional signal distribution corresponding to the second signal transmitted by the upper electrode.

12. An input system, comprising:

an electronic device including a pen state detection system which, in operation, detects a state of an electronic pen based on a signal distribution detected by a touch sensor including a plurality of sensor electrodes arranged in a plane shape, the electronic pen including at least one electrode;

an electronic pen used with the electronic device; and a server device which, in operation, bi-directionally communicates with the electronic device and stores a model parameter describing an input and output model to be built in the pen state detection system, wherein the electronic device, in operation, requests the server device to transmit the model parameter corresponding to the electronic pen when the electronic device detects the electronic pen.

* * * * *